United States Patent
Kenny

[11] Patent Number: 6,079,628
[45] Date of Patent: Jun. 27, 2000

[54] SELF-CONTAINED TEMPERATURE AND PRESSURE OPERATED PINCH VALVE

[76] Inventor: Thomas M. Kenny, 693 Nantmeal Rd., Glenmoore, Pa. 19343

[21] Appl. No.: 08/981,369

[22] PCT Filed: Apr. 18, 1996

[86] PCT No.: PCT/US96/05387

§ 371 Date: Feb. 5, 1998

§ 102(e) Date: Feb. 5, 1998

[87] PCT Pub. No.: WO97/39396

PCT Pub. Date: Oct. 23, 1997

Related U.S. Application Data

[63] Continuation-in-part of application No. 08/223,577, Apr. 6, 1994, abandoned, which is a continuation of application No. 09/001,754, Dec. 31, 1997, abandoned.

[51] Int. Cl.[7] .................................................. G05D 23/08
[52] U.S. Cl. .............................................. 236/93 R; 251/9
[58] Field of Search .................................. 251/4, 9, 212; 236/93 R

[56] References Cited

U.S. PATENT DOCUMENTS

| | | |
|---|---|---|
| 566,977 | 9/1896 | Frölich . |
| 596,581 | 1/1898 | Edson . |
| 875,320 | 12/1907 | Burnet . |
| 880,030 | 2/1908 | Leavitt . |
| 1,048,508 | 12/1912 | Dunham . |
| 1,120,707 | 12/1914 | Froehlich . |
| 1,198,918 | 9/1916 | Holmberg . |
| 2,095,506 | 10/1937 | Leutwiler et al. . |
| 2,279,002 | 4/1942 | MacNeil . |
| 2,590,215 | 3/1952 | Sausa . |
| 2,804,773 | 9/1957 | Domingo et al. . |
| 2,842,331 | 7/1958 | Anderson . |
| 2,884,866 | 5/1959 | Patterson . |
| 2,902,222 | 9/1959 | Noakes . |
| 3,017,903 | 1/1962 | Steffens . |
| 3,022,670 | 2/1962 | Sutliffe, Jr. . |
| 3,145,967 | 8/1964 | Gardner . |
| 3,353,560 | 11/1967 | McCulloch . |
| 3,514,034 | 5/1970 | Cushman . |
| 3,687,365 | 8/1972 | Laessig . |
| 3,701,513 | 10/1972 | Carter . |
| 3,901,438 | 8/1975 | Christiansson . |
| 3,947,528 | 3/1976 | Decker . |
| 4,039,003 | 8/1977 | Cheek . |
| 4,049,017 | 9/1977 | Jones . |
| 4,114,640 | 9/1978 | Forman . |
| 4,136,854 | 1/1979 | Ehmig et al. . |
| 4,248,376 | 2/1981 | Föller . |
| 4,368,754 | 1/1983 | Roberts . |
| 4,454,983 | 6/1984 | Tarvis, Jr. . |
| 4,569,502 | 2/1986 | Elliott . |
| 4,586,873 | 5/1986 | Lepretre et al. . |
| 4,657,043 | 4/1987 | Ampferer et al. . |
| 4,679,584 | 7/1987 | Wolff . |
| 4,727,902 | 3/1988 | Unterstein et al. . |
| 4,790,344 | 12/1988 | Chauvier et al. . |
| 4,841,739 | 6/1989 | Wallner . |
| 4,877,053 | 10/1989 | Yusko, Jr. et al. . |
| 4,895,341 | 1/1990 | Brown et al. . |
| 4,899,783 | 2/1990 | Yusko, Jr. et al. . |
| 4,936,339 | 6/1990 | Bennett . |
| 5,107,883 | 4/1992 | Shaw . |
| 5,358,202 | 10/1994 | Tse et al. . |

FOREIGN PATENT DOCUMENTS

| | | |
|---|---|---|
| 2548998 | 5/1977 | Germany . |
| 16545 | 7/1902 | United Kingdom . |

OTHER PUBLICATIONS

Photocopy of guide "Steam and Steam Trapping", cover page and pp. 1–20, Spirax Sarco Ltd., 1982.

Photocopy of brochure "Bestobell Steam—Steam Traps and Steam Specialties", by Bestobell Steam (admitted prior art).

Primary Examiner—William E. Tapolcai
Attorney, Agent, or Firm—Akin, Gump, Strauss, Hauer & Feld, L.L.P

[57] ABSTRACT

The present invention shows a self-contained, thermostatic temperature and pressure operated pinch valve in which the path of fluid flow through the valve may be automatically and directly controlled by the temperature and pressure of a flow material. Various conventional sensing mechanisms may be employed in the pinch valve of the invention.

5 Claims, 5 Drawing Sheets

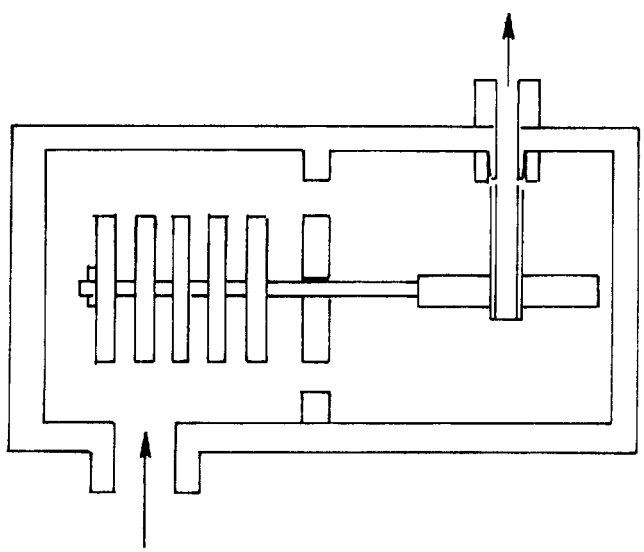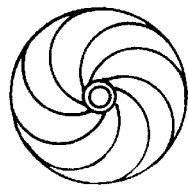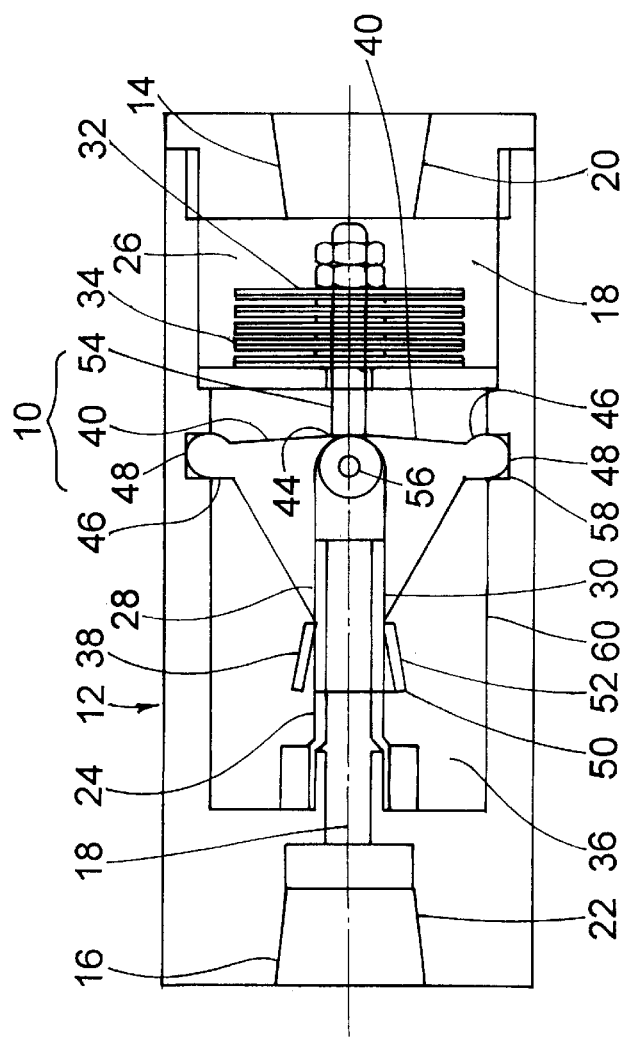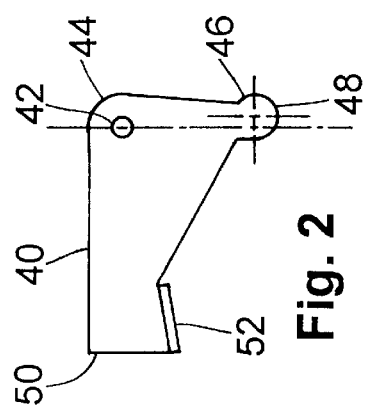

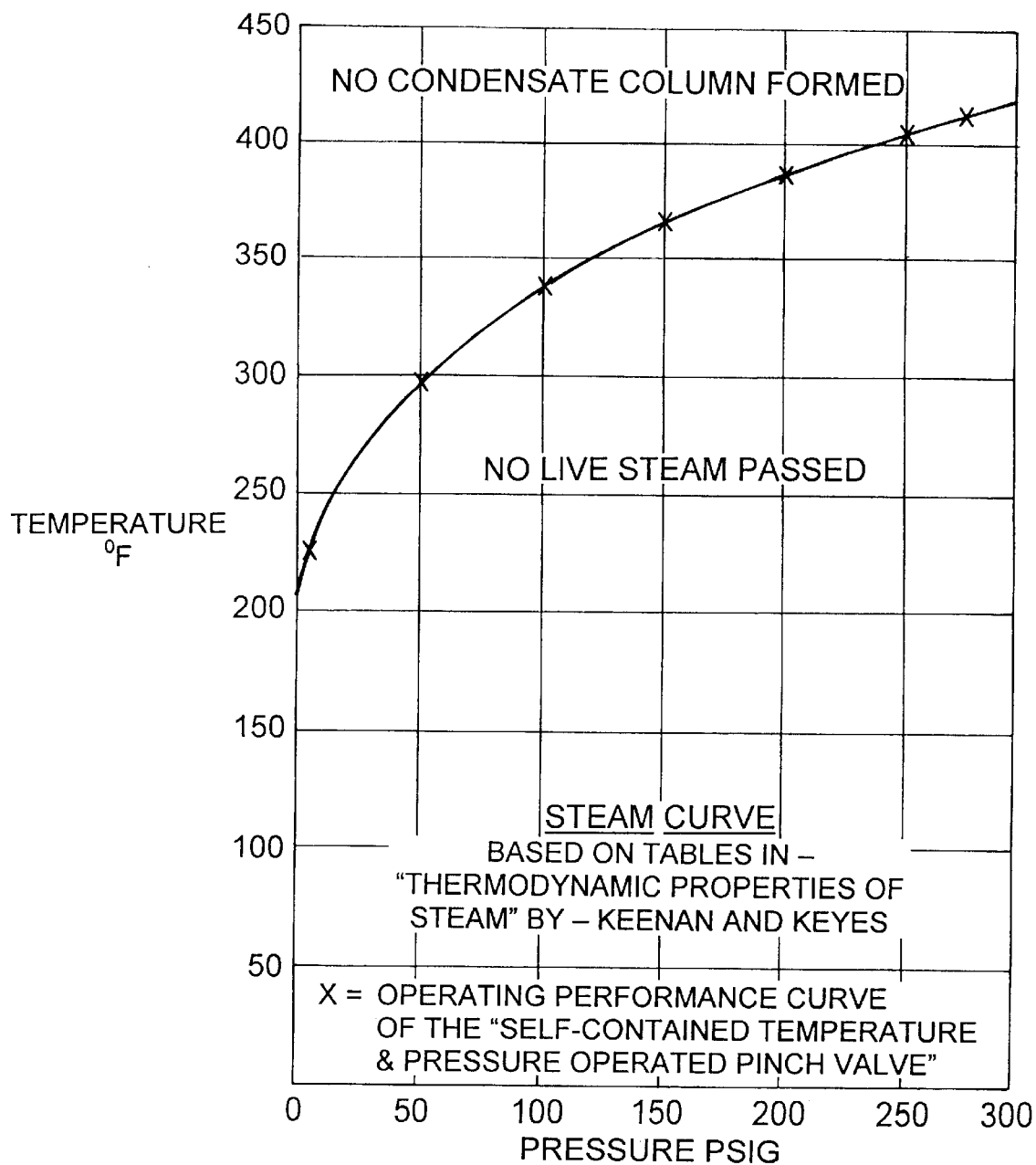

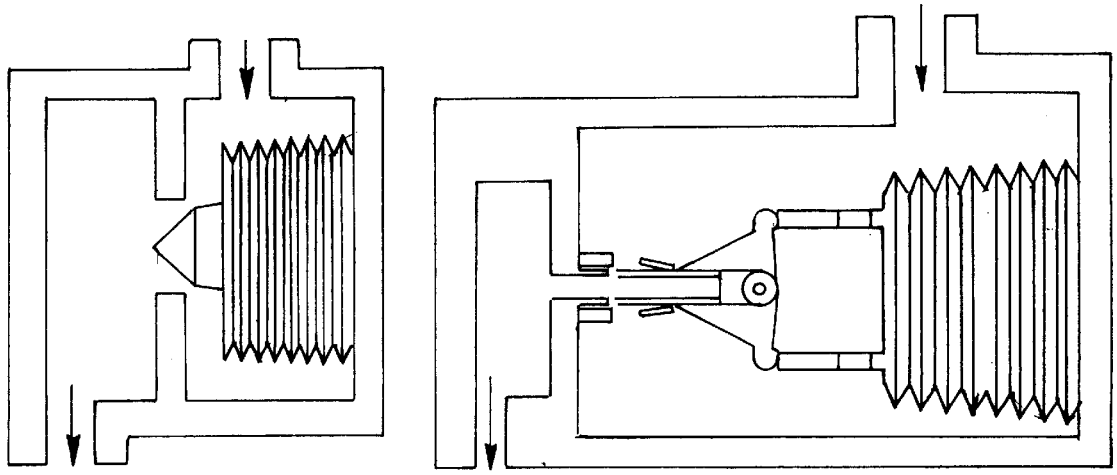
Fig. 8a PRIOR ART
Fig. 8b
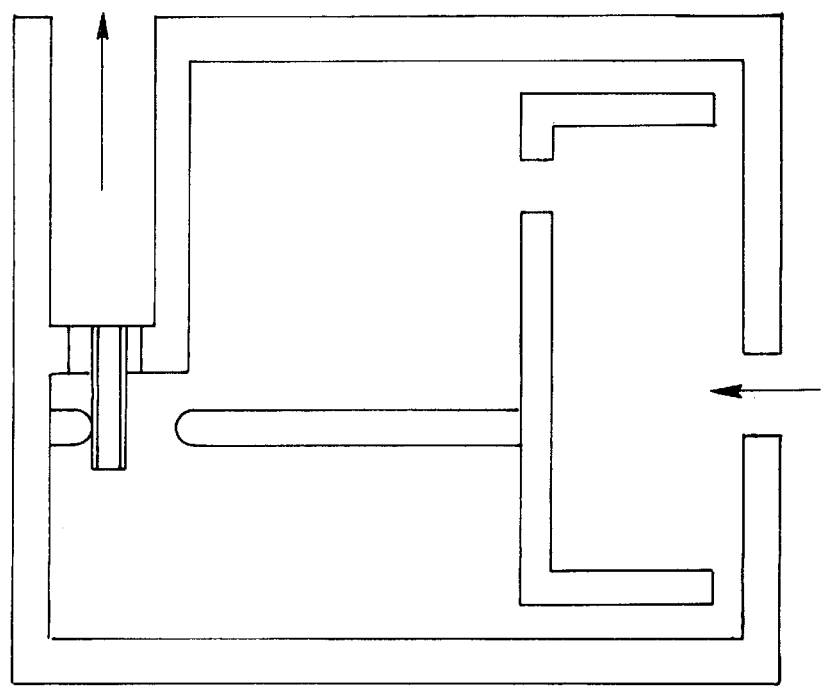
Fig. 7c

SELF-CONTAINED TEMPERATURE AND PRESSURE OPERATED PINCH VALVE

CROSS-REFERENCE TO RELATED APPLICATIONS

This application is a continuation-in-part of application Ser. No. 08/223,577, filed Apr. 6, 1994, entitled SELF-CONTAINED TEMPERATURE AND PRESSURE OPERATED PINCH VALVE, abandoned, is a continuation of application Ser. No. 09/001,754, filed Dec. 31, 1997, now abandoned.

BACKGROUND OF THE INVENTION

1. Field of the Invention

The present invention relates to valves for use in heated and pressurized fluid flow, such as the conveyancing of steam. In particular, the present invention relates to a self-contained, thermostatic temperature and pressure operated pinch valve in which the path of fluid flow through said valve may be automatically controlled by the temperature and pressure of a flow material, said pinch valve comprising:

(a) connection means adapted to incorporate said pinch valve within the path of said flow material;

(b) a flow transport path for fluid flow through said valve, comprising:
  i) an inlet for the transport of flow material into said valve;
  ii) a flow adjustment means comprising a flexible tube surrounding and defining at least a portion of said flow transport path, said flow adjustment means adapted to alternatively decrease the fluid flow in that portion of said flow transport path defined by said flow adjustment means upon an increase of pressure on a surface of the flow adjustment means or increase the fluid flow in the path upon a decrease of pressure on a surface of the flow adjustment means; and,
  iii) a flow measurement chamber within said flow transport path in direct pressure and temperature communication with said flow material, said flow measurement chamber being further provided with sensing means in direct pressure and temperature communication with the flow material; and,
  iv) an outlet for the transport of flow material from said valve; and, (c) a closure chamber within said valve and at least partly surrounding said flow adjustment means, said closure chamber being further provided with a closure means in direct operative communication with said flow adjustment means, and in operative communication with said sensing means;

wherein, said closure means is adapted to provide operative pressure upon said flow adjustment means in response to changes in the temperature and pressure of the flow material as determined by said sensing means.

2. Description of Related Art

Various forms of valves and steam traps are known which employ a plug-within-a-seat to interrupt the flow of steam. Where the steam is pressurized, however, the valve actuation means must be sensitive to both temperature and pressure, and not just temperature alone. In order to prevent the passage of live steam through the valve, without backing up a column of condensate, such a valve must follow the steam curve, i.e., the liquid-vapor transition of the fluid as a function of both its temperature and pressure. A number of activation means are known which are said to be sensitive to both temperature and pressure, i.e., they follow the steam curve. These include bimetallic discs, float, open bucket or inverted bucket, and bellows mechanisms.

Plug-within-a-seat valves and steam traps, however, are subject to failure in systems containing any kind of dirt or grit, wherein a small particle of dirt can prevent the plug from seating correctly and cause the valve to malfunction.

An alternative to plug-within-a-seat construction, which does not suffer from this kind of failure, is the pinch valve. In such construction, the steam flows through a conduit, at least a portion of which is elastomeric, and the flow can be interrupted by squeezing the elastomeric walls together (pinch). While this type of construction has been employed in constructions in which a temperature sensitive fluid expands to close off the elastomeric passageway, this known construction is sensitive only to temperature, not the combination of temperature and pressure, and cannot be employed in applications which require the valve to follow the steam curve.

Applicant is not aware of the application of a pinch valve construction in a valve or steam trap design in which the activation mechanism is sensitive to temperature and pressure, such as the activation methodologies enumerated above.

Certainly, one of the most pertinent references to the present invention is U.S. Pat. No. 4,454,983 to Tarvis, entitled TEMPERATURE CONTROLLED VALVE. This reference shows a control valve used as a steam trap with a flexible flow tube surrounded by a chamber filled with a fluid having a high co-efficient of thermal expansion in thermal contact with the flow. Changes in temperature of the flow will cause changes in the fluid volume, constricting the flexible flow tube. While the device of this reference is sensitive to the temperature of the flow, it is relatively isolated from the pressure of the flow, and so does not follow the temperature-pressure curve for the flow. Cited in the prosecution of the Tarvis patent were U.S. Pat. Nos. 566,977 to Fröhlich; 596,581 to Edson; 875,320 to Burnet; 1,048,508 to Dunham; 1,120,707 to Fröhlich; 1,198,918 to Holmberg; 2,095,506 to Leutwiler; 2,590,215 to Sausa; 2,804,773 to Domingo and Peragallo; 2,884,866 to Patterson; 2,902,222 to Noakes; 3,017,903 Steffens; 3,022,670 to Suttiffe; 3,145,967 to Gardner; 3,353,560 to McCulloch; 3,514,034 to Cushman; 3,687,365 to Laessig; and, 4,248,376 to Foller, as well as United Kingdom Patent 16,545 of 1903.

Of possible relevance are U.S. Pat. Nos. 2,842,331 to Anderson; 3,901,438 to Christiansson; 4,114,640 to Forman; and 4,569,502 to Elliott.

U.S. Pat. No. 2,842,331 to Anderson is entitled PINCH-OFF VALVE. This reference shows a valve used to mechanically pinch off a fluid flow.

U.S. Pat. No. 3,901,438 to Christiansson is entitled THERMOSTAT-REGULATED RADIATOR VALVE FOR SINGLE OR DOUBLE CONDUIT CENTRAL HEATING SYSTEMS. This reference shows a radiator valve regulated by a thermostat. Working fluid is provided to a radiator through a flexible conduit which can be pinched closed by a bimetalic cylinder in response to the temperature of a thermodynamically-spent return fluid flow. The device is, as reported, sensitive only to temperature, and the bimetallic element is in temperature contact only with the spent fluid flow. As such, it would be unsuitable in applications requiring operation activated by a combination of temperature and pressure. That is, it would not be responsive to the steam curve.

Secondly, the device has two distinct flow paths: one for flow of working fluid into a working environment; and another, separate path for the return flow of thermodynamically-spent fluid from the working environment, subsequent to its thermodynamic function. It is the primary purpose of the device of the Christiansson reference that the flow of working fluid in the intake path is controlled by the temperature, and the temperature only, of the spent fluid in the return path.

U.S. Pat. No. 4,114,640 to Forman is entitled DRAIN VALVE. This reference shows a two-part device which may be attached to a flexible tube, such as the outlet tube of a medical solution drainage bag employed in hospital and health care applications. The two part clip may be squeezed together to interrupt fluid flow and protect the open end of the tubing from contamination. The device is intended for manual operation, with no suggestion of any control by the temperature or pressure of the fluid.

U.S. Pat. No. 4,569,502 to Elliot is entitled PINCH VALVE. This reference shows a manually actuated pinch valve having a flexible valve body. The device is intended for manual operation, with no suggestion of any control by the temperature or pressure of the fluid.

U.S. Pat. No. 3,701,513 to Carter is entitled FUEL FEEDING APPARATUS. This reference shows a device for inter-mixing liquid fuel, air, and a measured proportion of water for delivery to an internal combustion engine. The liquid fuel is supplied by way of a compressible elastomeric tube.

U.S. Pat. No. 3,947,258 to Decker is entitled VAPOR STRIPPING AND RECOVERY METHOD AND APPARATUS. This reference shows a method and apparatus for removing vapors from an air-vapor mixture.

U.S. Pat. No. 4,586,873 to Lepretre, Balzano, Caillault is entitled MIXER-EJECTOR WITH JET EFFECT AND VARIABLE CROSS-SECTION. This reference shows a mixer-ejector with jet effect incorporates inductor nozzles opening into a venturi profile conduit having in succession a highly convergent suction sleeve, a coupling wall and a diffuser. The coupling wall is a variable-profile venturi part, consisting of a hollow sleeve made of distortable elastic material in a casing with leaktight sealing and incorporates means for introducing a fluid into the enclosure formed by the sleeve and the casing.

U.S. Pat. No. 4,790,344 to Chauvier and Woodman is entitled FLUID FLOW REGULATOR. This reference shows a submersible cleaner in which the inlet may be regulated by pressurizing a chamber surrounding a collapsible conduit.

U.S. Pat. No. 4,841,739 to Wallner is entitled AUTOMOTIVE AIR-CONDITIONING SYSTEM AND APPARATUS. This reference shows an auto air-conditioner, with a refrigerant circuit with a low-pressure portion and a high-pressure portion. A pressure-release valve with a blow-off outlet is provided between the compressor and the condenser in the high-pressure portion.

U.S. Pat. Nos. 4,877,053, 4,895,341, and 4,899,783 are all based upon the same original U.S. patent application to Yusko, Brown, Kalain, and Williams are each entitled PINCH VALVE. These references shows some rather sophisticated pinch valves intended for use in biotechnological environments. These pinch valves are said to be useful because if the valving mechanism does not come into contact with the material conveyed, then the valve does not become contaminated and require extensive sterilization and cleaning. The pinch valves of these references are intended to pinch off elastomeric conduits under the control of an operator.

U.S. Pat. No. 5,107,883 to Shaw is entitled PINCH VALVE CONTROL SYSTEM FOR WATER LINE ISOLATION AND METHOD. This reference shows a pinch valve control system for regulating the flow of water through the water distribution network of a building. Remote-controlled, fluid-operated pinch valves are spaced at various locations throughout the water distribution network of the building and may be selectively operated from a remote station to stop the flow of water in any pipe throughout the building's water distribution network. The use of pinch valves permits water flow to be increased or decreased gradually and reduces or eliminates water hammer. The pinch valve is operated by compressed fluid which enters the sleeve around the pinch valve to stop the flow of water in the pipe. To resume the water flow, the fluid in the pinch valve is released.

SUMMARY OF THE INVENTION

It is an object of the present invention to provide a self-contained pinch valve which is sensitive to changes in the temperature and pressure of the flow material.

The other objects, features and advantages of the present invention will become more apparent in light of the following detailed description of the preferred embodiment thereof.

According to the preferred embodiment of the present invention, there is provided a self-contained, thermostatic temperature and pressure operated pinch valve in which the path of fluid flow through said valve may be automatically controlled by the temperature and pressure of a flow material, said pinch valve comprising:

(a) connection means adapted to incorporate said pinch valve within the path of said flow material;

(b) a flow transport path for fluid flow through said valve, comprising:
  i) an inlet for the transport of flow material into said valve;
  ii) a flow adjustment means comprising a flexible tube surrounding and defining at least a portion of said flow transport path, said flow adjustment means adapted to alternatively decrease the fluid flow in that portion of said flow transport path defined by said flow adjustment means upon an increase of pressure on a surface of the flow adjustment means or increase the fluid flow in the path upon a decrease of pressure on a surface of the flow adjustment means; and,
  iii) a flow measurement chamber within said flow transport path in direct pressure and temperature communication with said flow material, said flow measurement chamber being further provided with sensing means in direct pressure and temperature communication with the flow material; and,
  iv) an outlet for the transport of flow material from said valve; and, (c) a closure chamber within said valve and at least partly surrounding said flow adjustment means, said closure chamber being further provided with a closure means in direct operative communication with said flow adjustment means, and in operative communication with said sensing means;

wherein, said closure means is adapted to provide operative pressure upon said flow adjustment means in response to changes in the temperature and pressure of the flow material as determined by said sensing means.

BRIEF DESCRIPTION OF THE DRAWINGS

FIG. 1 shows a cross-sectional view of one embodiment of the present invention.

FIG. 2 shows detail of the closure mechanism of the embodiment of FIG. 1.

FIG. 3 shows the operating performance data of a prototype valve of FIG. 1, superimposed upon a steam curve taken from the technical literature.

FIG. 4a shows a cross-sectional view of another embodiment of the device of the present invention with an iris mechanism employed as the closure means.

FIG. 4b shows detail of the iris mechanism.

FIG. 7c shows a simplified embodiment of the device of the present invention employing an inverted bucket as the sensing means.

FIG. 8a shows, in diagrammatic form, a prior art device employing a bellows mechanism as the sensing means.

FIG. 8b shows an embodiment of the present invention employing a bellows mechanism as the sensing means.

DETAILED DESCRIPTION OF THE PREFERRED EMBODIMENT

Figure 6A:
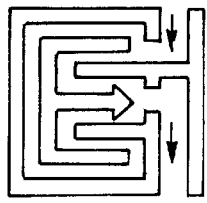
FIG. 6a shows, in diagrammatic form, a prior art device employing an open bucket as the sensing means.

As noted above, FIG. 1 shows a cross-sectional view of one embodiment of the present invention. This embodiment 10 is a self-contained, thermostatic temperature and pressure operated pinch valve 12. The novelty of this pinch valve resides in the ability of the valve 12 to follow the steam curve. Thus, the path of fluid flow through this pinch valve 12 may be automatically controlled by the temperature and pressure of the flow material.

In its basic embodiment, as shown in FIG. 1, the pinch valve 12 of the present invention comprises, first, at least one connection means 14 adapted to incorporate the pinch valve 12 within the path of a flow material. In practice, this connection means 14 may be a screw thread, a snap fitting, some type of welded connection, or any other connection means known to the art. While some valves may be constructed to employ only one connection means having flow connections internal to the system, in many applications the valve is intended for installation as a throughput device, as shown in FIG. 1. In that embodiment 10, the pinch valve 12 is shown with a connection means 14 at a first end thereof, and a second connection means 16 at the second end thereof.

The first connection means 14 and the second connection means 16 define the outer limits of a flow transport path 18 for fluid flow through the pinch valve 12. This flow transport path 18 comprises an inlet 20, approximately coextensive with the first connection means 14, and an outlet 22, approximately coextensive with the second connection means 16. The inlet 20 provides access for the transport of flow material into the pinch valve 12. The outlet 22 provides an egress for the transport of flow material from the pinch valve 12, as regulated by action of the pinch valve 12.

Also included in the flow transport path 18 is a flow adjustment means 24 and a flow measurement chamber 26. In the illustrated embodiment 10, the flow adjustment means 24 comprises a flexible tube 28 surrounding and defining at least a portion of the flow transport path 18. Further, flow adjustment means 24 is adapted to alternatively decrease the fluid flow in that portion of the flow transport path 18 defined by the flow adjustment means 24 upon an increase of pressure on a surface 30 of the flow adjustment means 24 or increase the fluid flow in the flow transport path 18 upon a decrease of pressure on a surface 30 of the flow adjustment means 24.

The flow measurement chamber 26, which is also part of the flow transport path 18, is in direct pressure and temperature communication with the flow material. The flow measurement chamber 26 is further provided with sensing means 32 in direct pressure and temperature communication with the flow material In the illustrated embodiment 10, the sensing means 32 is shown as a plurality of bimetallic discs 34. As known in the art, an array of bimetallic discs can provide a response to only the temperature of the fluid flow or, thermostaticly, to the temperature and pressure of the fluid flow, depending upon how they are positioned within the flow chamber. Thus, if the closure operation is independent of the incoming flow, the operation is temperature dependent only. Where the closure operation opposes the flow, however, as in the embodiment illustrated in FIG. 1, the device is sensitive to temperature and pressure, and follows the steam curve.

The use of such bimetallic discs is well known in the manufacture of plug-within-a-seat type valves, as are various other sensing methodologies including, without limitation, float, open bucket, inverted bucket, and bellows type sensing devices. Such alternate sensing devices, illustrated in additional embodiments hereinafter, could be substituted by one skilled in the art for the bimetallic discs 34 shown.

The pinch valve 12 is also comprised of a closure chamber 36, within the pinch valve 12 and at least partly surrounding the flow adjustment means 24. This closure chamber 36 is further provided with a closure means 38 in direct pressure communication with the surface 30 of the flow adjustment means 24. This closure means 38 is also in operative communication with the previously described sensing means 32.

The closure means 38 of the illustrated embodiment 10 of the present invention, is a mated pair of generally triangular members 40, one of which is shown more clearly in FIG. 2. This triangular member 40, is comprised of a substantially flat piece of suitable material, such as metal, with a hole 42 therethrough proximate to a first vertex 44, and a rounded shoulder 46 at a second vertex 48. At the third vertex 50, the closure means 38 of the illustrated embodiment 10 is provided with an enlarged closure portion 52 extending perpendicularly from the generally triangular member 40.

Again with reference to FIG. 1, a pair of mating triangular members 40 are shown in operative position within the pinch valve 12 of the illustrated embodiment 10. In this position, the hole 42 of each triangular member 40 is attached to connection rod 54 by retainer 56, which may be a nut and bolt, a pin, or other joining mechanism known to the art. The rounded shoulder 46 of the second vertex 48 of each triangular member 40 resides in a circumferential groove 58 cut in the interior wall 60 of the pinch valve 12 of the illustrated embodiment 10.

In this position, further, the enlarged perpendicular closure portion 52 of each triangular member 40 acts as a closure means 38, and is seen in direct pressure communication with the surface 30 of flow adjustment means 24. As such, each closure means 38 is able to provide pressure upon the surface 30 of said flow adjustment means 24 in response to changes in the temperature and pressure of the flow material as determined by the sensing means 32. Thus, as the bimetallic discs 34 expand or contract with changes in the temperature and pressure of the flow material transported through the pinch valve 12, connection rod 54 pulls or pushes upon each triangular member 40 at its first vertex 44. The confined positioning of the second vertex 48 of each triangular member 40 within the circumferential groove 58 of the interior wall 60, translates the longitudinal motion of the connection rod 54 into a pinching action of the closure means 38.

In this manner, the pinch valve 12 of the illustrated embodiment 10 is able to provide a self-contained, thermostatic temperature and pressure operated pinch valve in which the path of fluid flow through the valve may be automatically controlled by the temperature and pressure of a flow material.

FIG. 3 shows the operating performance data of a prototype valve of FIG. 1, superimposed upon a steam curve taken from the technical literature.

FIGS. 4, 4b, 5b, 6b, 6c, 7b, 7c, and 8b disclose alternate embodiments of the present indention. These alternate embodiments are similar to the embodiment discussed above in connection with FIGS. 1 and 2. Accordingly, a complete recitation of the features of the alternate embodiments is not repeated. Instead, like element numerals from FIGS. 1 and 2 have been used in the Figs. which apply to the alternate embodiments to identify like elements for purposes of brevity and convenience only, and is not limiting.

FIG. 4 shows a cross-sectional view of another embodiment of the device of the present invention with an iris mechanism 70 employed as the closure means 38.

Figure 5A:
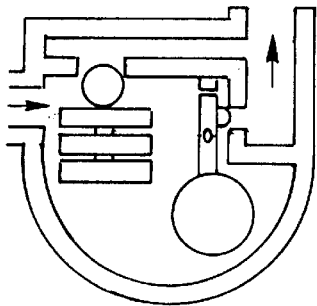
FIG. 5a shows, in diagrammatic form, a prior art device employing a float as the sensing means.

FIG. 5a shows, in diagrammatic form, a prior art device employing a float 72 as the sensing means 32.

Figure 5B:
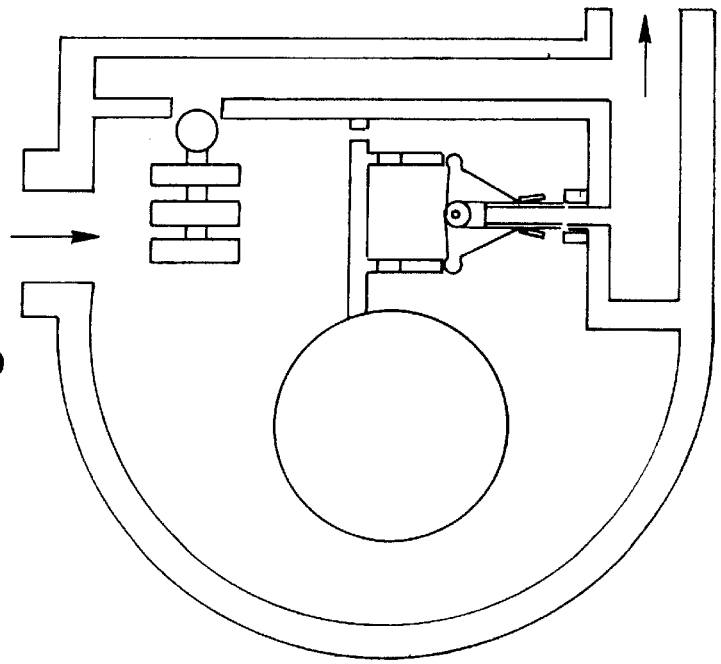
FIG. 5b shows an embodiment of the device of the present invention employing a float as the sensing means.

FIG. 5b shows an embodiment of the device of the present invention employing a float 72 as the sensing means 32.

FIG. 6a shows, in diagrammatic form, a prior art device employing an open bucket 74 as the sensing means 32.

Figure 6B:
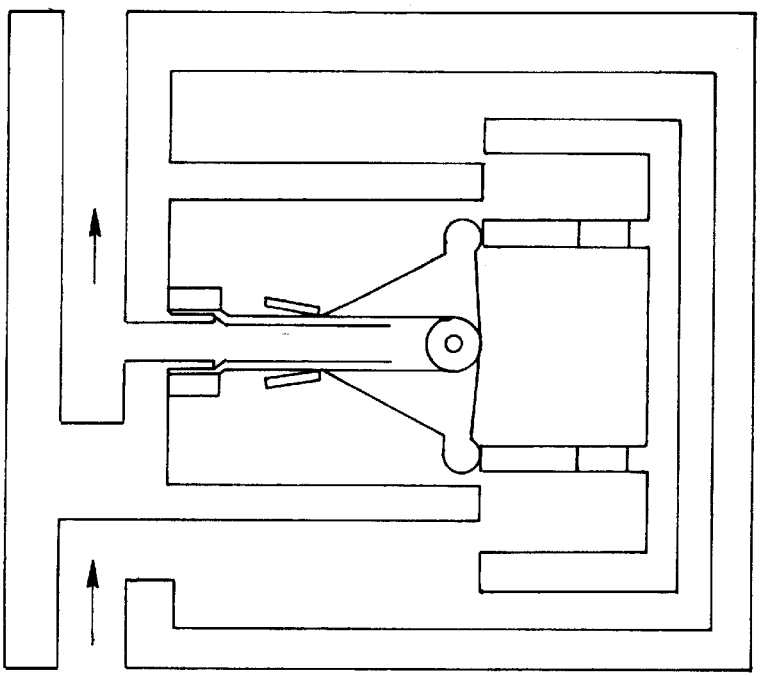
FIG. 6b shows an embodiment of the present invention employing an open bucket as the sensing means.

FIG. 6b shows an embodiment of the present invention employing an open bucket 74 as the sensing means 32.

Figure 6C:
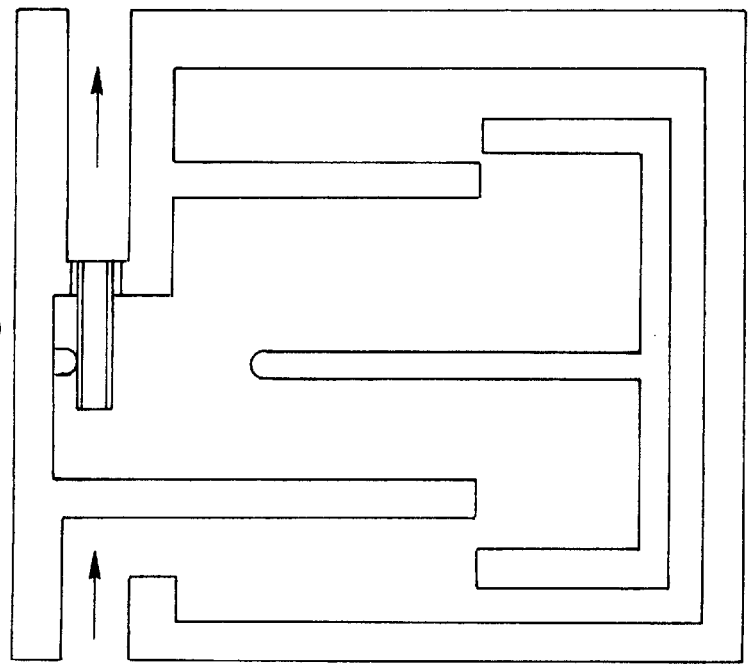
FIG. 6c shows a simplified embodiment of the device of the present invention employing an open bucket as the sensing means.

FIG. 6c shows a simplified embodiment of the device of the present invention employing an open bucket 74 as the sensing means 32.

Figure 7A:
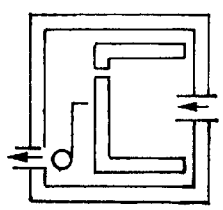
FIG. 7a shows, in diagrammatic form, a prior art device employing an inverted bucket as the sensing means.

FIG. 7a shows, in diagrammatic form, a prior art device employing an inverted bucket 76 as the sensing means 32.

Figure 7B:
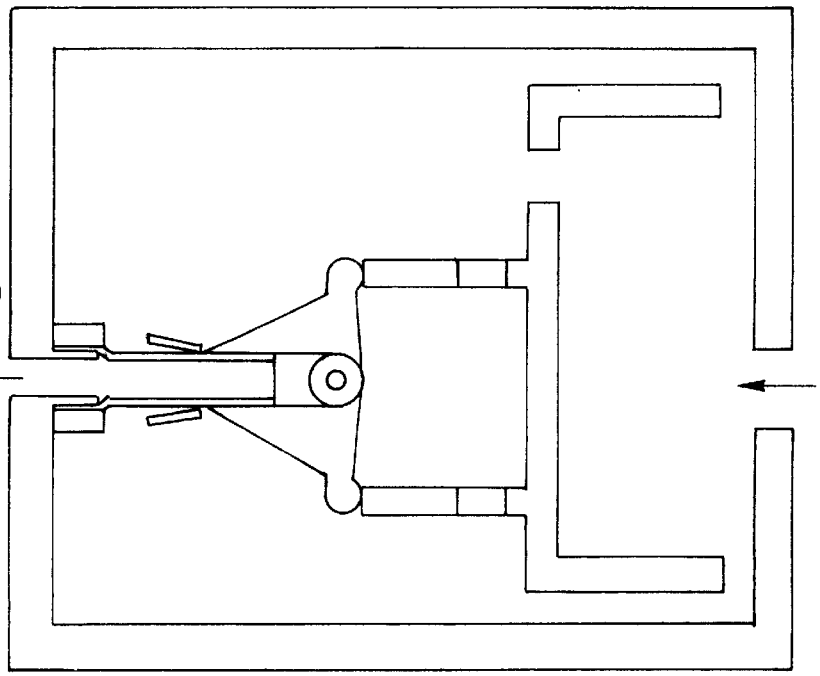
FIG. 7b shows an embodiment of the present invention employing an inverted bucket as the sensing means.

FIG. 7b shows an embodiment of the present invention employing an inverted bucket 76 as the sensing means 32.

FIG. 7c shows a simplified embodiment of the device of the present invention employing an inverted bucket 76 as the sensing means 32.

FIG. 8a shows, in diagrammatic form, a prior art device employing a bellows mechanism 78 as the sensing means 32.

FIG. 8b shows an embodiment of the present invention employing a bellows mechanism 78 as the sensing means 32.

Other features, advantages, and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. A self-contained, temperature and pressure operated pinch valve in which the path of fluid flow through said valve may be automatically controlled by the temperature and pressure of a flow material, said pinch valve comprising:
   (a) a flow transport path for fluid flow through said valve, said flow transport path including a flexible tube surrounding and defining at least a portion of said flow transport path, said flexible tube adapted to alternatively decrease the fluid flow in that portion of said flow transport path defined by said flexible tube upon an increase of pressure on a surface of the flexible tube or increase the fluid flow in the path upon a decrease of pressure on a surface of the flexible tube; and,
   (b) a sensor within the flow transport path in direct temperature communication with the flow material; and,
   (c) a closure in direct operative communication with said flexible tube in operative communication with said sensor;
   wherein, said closure is adapted to provide operative pressure upon said flexible tube in response to changes in the temperature as determined by said sensor and line pressure of the flow material.

2. The pinch valve of claim 1 in which said closure is pincher mechanism.

3. The pinch valve of claim 2 in which said pincher mechanism is comprised of two opposed faces.

4. The pinch valve of claim 1 in which said closure operates mechanically.

5. The pinch valve of claim 1 in which said sensor is a plurality of bimetallic discs.

\* \* \* \* \*